Patented Oct. 16, 1934

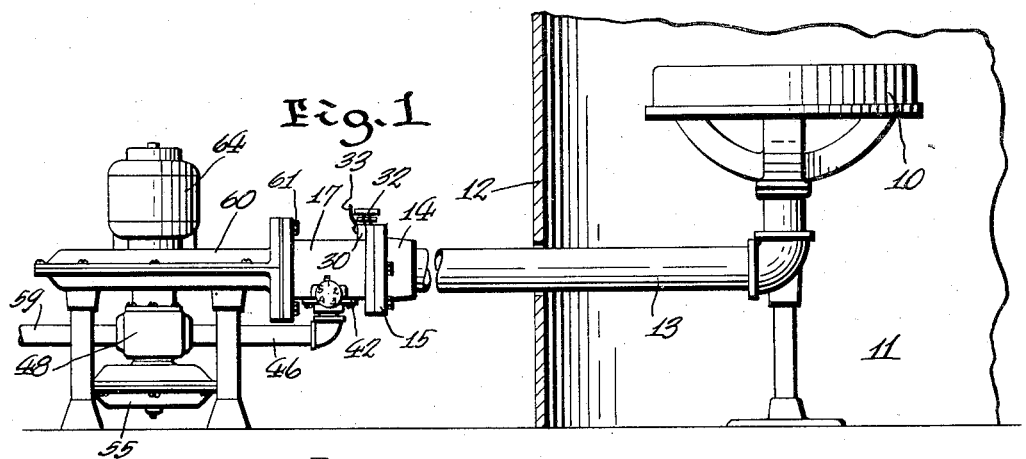
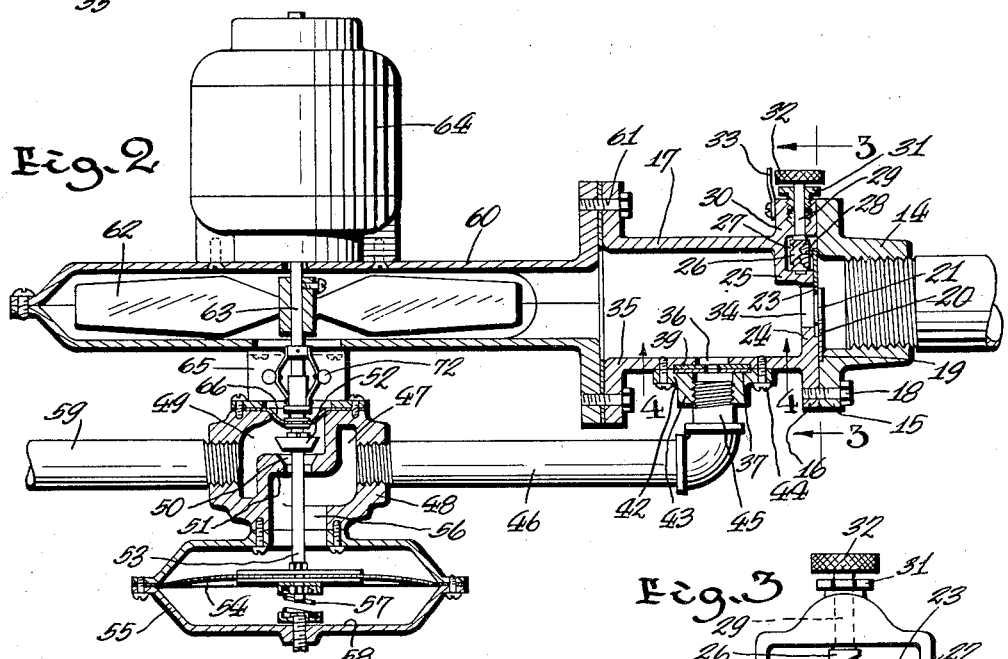
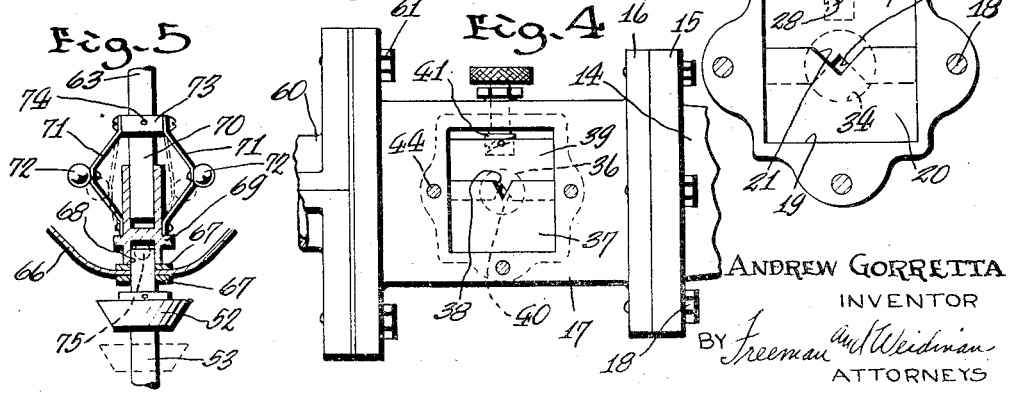

1,977,336

UNITED STATES PATENT OFFICE 1,977,336

FUEL SUPPLY CONTROL APPARATUS

Andrew Gorretta, Cleveland, Ohio

Application July 27, 1932, Serial No. 625,068

14 Claims. (Cl. 158—119)

This invention relates to fuel supply control apparatus and has for its principal object the provision of new and improved apparatus of this type.

In the drawing accompanying this specification and forming a part of this application I have shown, for purposes of illustration, one form which my invention may assume, and in the drawing:

Figure 1 is a side elevational fragmentary sectional view, showing an embodiment of the invention, Figure 2 is a fragmentary enlarged vertical sectional view of said embodiment, Figure 3 is an enlarged vertical sectional view corresponding to the line 3—3 of Figure 2, Figure 4 is an enlarged horizontal sectional view corresponding to the line 4—4 of Figure 2, while Figure 5 is an enlarged fragmentary vertical sectional view of control mechanism used in connection with the invention.

The embodiment of the invention herein described and illustrated in the drawing, comprises a gas burner 10 adapted to be disposed in the fire-box 11 of a furnace, illustrated as at 12, and is adapted to be supplied with a mixture of air and gas through a pipe 13, communicating at one end with the burner 10 and having its opposite end threaded into a nipple 14 having its flange 15 secured to the flange 16 of a mixing chamber housing 17 by means of screw bolts 18.

Rigidly clamped between the flanges 15 and 16 and fitted into a rabbet 19 formed in the outer surface of the flange 15, is a metallic plate 20 having a centrally disposed V-shaped notch 21 in its upper edge, adapted to cooperate with a similar but oppositely disposed notch 22 formed centrally in the overlapping edge of a slidable plate 23, slidably supported in a recess in the end wall 24 of the mixing chamber housing 17, the latter being offset as at 25 to provide a recess for the accommodation of a cam 26 having a cam groove 27 in its periphery, for the reception of a projection 28 fixed to the upper portion of the slidable plate 23, and the cam 26 is carried by a stem 29 rotatably mounted in a boss 30 carrying a packing gland 31 surrounding the stem 29, and the stem 29 has a knurled head 32 by means of which the stem may be manipulated, the pitch of the cam being such that one complete revolution brings about the maximum sliding adjustment of the slidable plate 23, and the knurled head 32 is provided with graduations adapted to be aligned with an indicating finger 33, the wall 24 of the housing 17 having a relatively large aperture 34 communicating with the pipe 13 through the opening provided by the notches 21 and 22 in certain positions of the parts.

One side wall 35 of the housing 17 is also provided with a relatively large aperture 36, and extending over the aperture 36 is a fixed plate 37, having a V-shaped notch 38, adapted to cooperate with an overlapping plate 39 having a V-shaped notch 40 and movable through manipulation of a cam 41 operably connected to the plate 39 in the same manner as the cam 26 to the plate 23, the plates 37 and 39 being secured in position by a plate 42 forming part of a nipple 43 secured in position by screw bolts 44, the plates 37 and 39 being accommodated in suitable recesses provided in the wall 35 and in the adjacent face of the plate 42. The nipple 43 has a pipe section 45 threaded thereon, and communicates with a pipe 46, and with the outlet chamber 47 of a valve casing 48, and the outlet chamber 47 communicates with the inlet chamber 49 through a conical valve opening 50 formed in a partition 51 dividing the valve casing 48 into chambers 47 and 49, and the valve opening 50 is adapted to be closed by a conical valve 52 fixedly secured to a valve stem 53 having its lower end connected to a diaphragm 54, and the diaphragm 54 is secured in a diaphragm casing 55 communicating at one side of the diaphragm, as at 56, with the outlet chamber 47 of the valve casing 48, a spring 57 being disposed between the opposite side of the diaphragm 54 and the adjacent wall 58 of the diaphragm casing 55, so that the valve 52 is normally urged to a position to open communication between the inlet chamber 49 and outlet chamber 47 of the valve casing 48, a pipe 59 leading to a source of gas supply, which may be available at usual pressures which vary somewhat at different periods.

The mixing chamber housing 17 also communicates with a fan chamber 60 having flanges secured to corresponding flanges of the mixing chamber housing 17 by bolts 61, and disposed within the chamber 60 is a fan 62 fixed to the armature shaft 63 of a motor 64 secured to the fan casing, and the fan casing 60 is connected to the valve casing 48 by spacing sections 65, and the fan chamber 60 is sealed from the valve casing 48 by means of a flexible diaphragm 66 having an aperture for the reception of the upper end of the valve stem 53, a washer 67 being secured to each side of the diaphragm 66 and to the adjacent portion of the valve stem 53, and the upper end of the valve stem 53 fits into a socket 68, provided in a sleeve 69 slidably mounted upon the lower end 70 of the motor shaft 63, and secured to the sleeve 69 is a plurality of strips 71 of spring metal, having metallic balls 72 secured to each intermediate its ends, and all of the strips 71 have their opposite ends secured to a collar 73 fixed to the motor shaft 63 by a set screw 74, and a thrust bearing in the form of a ball 75 is accommodated in the upper end of the stem 53 so as to be interposed between the upper end of the stem 53 and the adjacent portion of the sleeve 69.

In use, when the motor 64 is energized, rotation of the shaft 63 causes rotation of the fan 62 and discharge of air under pressure to the mixing chamber housing 17; also causes the balls 72 to be thrown outwardly centrifugally, resulting in lifting of the sleeve 69, and permitting the valve 52 to be elevated under influence of the spring 57, thereby permitting gaseous fuel entering the inlet chamber 49 of the valve casing 48, to pass through the valve seat opening 50 into the chamber 47, through the pipe 46, and assuming that the plates 37 and 39 are adjusted to provide an aperture, thence through said aperture into the mixing housing 17, and to be mixed with the incoming air from the fan chamber 60, the mixture then passes through the aperture 34 in the end wall 24 of the housing 17; and assuming the plates 20 and 23 to be adjusted to provide an aperture, through such aperture, and via the pipe 13 to the burner 10.

During this operation the valve 52 is free to move to open and close the valve opening through the valve seat 50, various degrees dependent upon variations in pressure of gaseous fuel supplied through the pipe 59. When it is desired to shut down the operation of the apparatus, the motor is stopped, and the balls 72 of the centrifugal device, no longer being thrown out centrifugally, under the combined weight of the balls 72, and the tendency of the spring strips 71 to straighten out, will cause the sleeve 69 to be lowered, bringing such pressure to bear upon the upper end of the valve stem 53 as to close the valve 52 against the influence of the spring 57, thus entirely closing off the gas from the burner 10.

By provision of the relatively movable plates 37 and 39 the aperture defined by the notches 38 and 40 may be adjustably varied in size so as to closely control the amount of gas passing to the mixing chamber housing 17. Likewise the amount of mixed fuel passing from the mixing chamber housing 17 through the opening 34, may be closely controlled through manipulation of the plates 20 and 23 controlling the aperture provided by the notches 21 and 22, so that the exact amount of fuel desired may be delivered to the burner 10.

It will be apparent that the embodiment herein illustrated and described accomplishes the principal object of my invention, and it will be understood that various uses and advantages not herein particularly pointed out are inherent in the invention, and various changes and modifications may be made without departing from the spirit of said invention, and under these circumstances it will be appreciated that the embodiment disclosed is illustrative only and the invention is not limited thereto.

I claim:

1. Apparatus for supplying fuel to a burner, comprising: a mixing device communicable with said burner; conduit means connecting with a source of gaseous fuel supply subject to variation in pressure, and operable to deliver gaseous fuel to said mixing device; valve means subject to the variable pressure of said source of gaseous fuel supply and operable to regulate passage of gaseous fuel through said conduit means, said valve means being automatically movable in response to the variable pressure at said source; mechanism for delivering air to said mixing device; and control means controlled by said mechanism for automatically closing said valve when said mechanism is at rest, said control means being automatically operable to assume a position to permit free movement of said valve means when said mechanism is operating to deliver air to said burner.

2. Apparatus for supplying fuel to a burner, comprising: a mixing device communicable with said burner; conduit means connecting with a source of gaseous fuel supply subject to variation in pressure, and operable to deliver gaseous fuel to said mixing device; valve means subject to the variable pressure of said source of gaseous fuel supply and operable to regulate passage of gaseous fuel through said conduit means, said valve means being automatically movable in response to the variable pressure at said source; mechanism for delivering air to said mixing device and having a rotating member; and a control device centrifugally operable by rotation of said rotating member and having a lost motion connection with said valve means, said control device being operable to affect the position of said valve means dependent upon whether or not said rotating member is rotating.

3. Apparatus for supplying fuel to a burner, comprising: a mixing device communicable with said burner; conduit means communicating with a source of gaseous fuel supply subject to variation in pressure, and operable to deliver gaseous fuel to said mixing device; valve means having a valve opening, and a diaphragm-controlled valve subject to the variable pressure of said source of gaseous fuel supply but independent of atmospheric pressure and operable to regulate passage of gaseous fuel through said conduit means, said diaphragm-controlled valve having means normally urging the same in a direction to open said valve, and said diaphragm-controlled valve under influence of variable pressure from said source being operable automatically to move in a closing direction when pressure from said source increases and to move in an opening direction when said pressure decreases; air delivering mechanism operable to deliver air under pressure to said burner; and control means cooperable with said diaphragm-controlled valve and said mechanism and automatically operable to close said valve when said mechanism is at rest.

4. Apparatus for supplying fuel to a burner, comprising: a mixing device communicable with said burner; conduit means connecting with a source of gaseous fuel supply subject to variation in pressure, and operable to deliver gaseous fuel to said mixing device; valve means subject to the variable pressure of said source of gaseous fuel supply and operable to regulate passage of gaseous fuel through said conduit means, said valve means automatically movable in response to the variable pressure at said source; a motor and fan unit for delivering air to said mixing device; and control means controlled by said unit, comprising a centrifugal device connected to the motor shaft and to said valve means automatically operable upon rotation of said fan to assume a position to permit free movement of said valve means and operable upon cessation of movement of said fan to close said valve means.

5. Apparatus for supplying fuel to a burner, comprising: a mixing device communicable with said burner; conduit means connecting with a source of gaseous fuel supply subject to variation in pressure, and operable to deliver gaseous fuel to said mixing device; valve means subject to the variable pressure of said source of gaseous fuel supply and operable to regulate passage of gaseous fuel through said conduit means, said valve means automatically movable in response to the variable pressure at said source; a motor and fan unit for delivering air to said mixing device; and control means controlled by said unit, comprising a centrifugal device connected to said motor shaft and having a lost motion connection with said valve means, operable automatically upon rotation of said fan to assume a position to permit free movement of said valve means and operable upon cessation of movement of said fan to close said valve means.

6. Apparatus for supply fuel to a burner, comprising: a mixing device communicable with said burner; conduit means communicating with a source of gaseous fuel supply subject to variation in pressure, and operable to deliver gaseous fuel to said mixing device; valve means having a valve opening, and a diaphragm-controlled valve subject to the variable pressure of said source of gaseous fuel supply and operable to regulate passage of gaseous fuel through said conduit means, said diaphragm-controlled valve having means normally urging the same in a direction to open said valve, and said diaphragm-controlled valve under influence of variable pressure from said source being operable automatically to move in a closing direction when pressure from said source increases and to move in an opening direction when said pressure decreases; air delivering mechanism operable to deliver air under pressure to said burner; and control means cooperable with said diaphragm-controlled valve and said mechanism and automatically operable to close said valve when said mechanism is at rest; said control means being automatically movable to assume a position permitting free movement of said valve means when said mechanism is operating to deliver air to said burner.

7. Apparatus for supplying fuel to a burner, comprising: a mixing device communicable with said burner; conduit means communicating with a source of gaseous fuel supply subject to variation in pressure and operable to deliver gaseous fuel to said mixing device; valve means having a valve opening, and a diaphragm-controlled valve subject to the variable pressure of said source of gaseous fuel supply and operable to regulate passage of gaseous fuel through said conduit means, said diaphragm-controlled valve having means normally urging the same in a direction to open said valve, and said diaphragm-controlled valve under influence of variable pressure from said source being operable automatically to move in a closing direction when pressure from said source increases and to move in an opening direction when said pressure decreases; a motor and fan unit operable to deliver air under pressure to said burner; and control means controlled by said unit, including a centrifugal device connected to the motor shaft and to said valve, automatically operable upon rotation of said fan to assume a position permitting free movement of said valve when said unit is operating to deliver air to said burner, and operable upon cessation of movement of said fan to close said valve.

8. Apparatus for supplying fuel to a burner, comprising: a mixing device communicable with said burner; conduit means communicating with a source of gaseous fuel supply subject to variation in pressure and operable to deliver gaseous fuel to said mixing device; valve means having a valve opening, and a diaphragm-controlled valve subject to the variable pressure of said source of gaseous fuel supply and operable to regulate passage of gaseous fuel through said conduit means, said diaphragm-controlled valve having means normally urging the same in a direction to open said valve, and said diaphragm-controlled valve under influence of variable pressure from said source being operable automatically to move in a closing direction when pressure from said source increases and to move in an opening direction when said pressure decreases; a motor and fan unit operable to deliver air under pressure to said burner; and control means controlled by said unit, including a centrifugal device connected to the motor shaft and having a lost motion connection with said valve, automatically operable upon rotation of said fan to assume a position permitting free movement of said valve when said unit is operating to deliver air to said burner, and operable upon cessation of movement of said fan to close said valve.

9. Apparatus for supplying fuel to a burner, comprising: a mixing device communicable with said burner; conduit means communicating with a source of gaseous fuel supply subject to variation in pressure, and operable to deliver gaseous fuel to said mixing device; a diaphragm-controlled valve subject to the variable pressure of said source of gaseous fuel supply and operable to regulate passage of gaseous fuel through said conduit means, said diaphragm-controlled valve having means on one side of said diaphragm normally urging said valve in a direction to open said valve, and said diaphragm-controlled valve under influence of variable pressure from said source being operable automatically to move in a closing direction when pressure from said source increases and to move in an opening direction when said pressure decreases; air delivering mechanism operable to deliver air under pressure to said burner; and control means on the other side of said diaphragm and cooperable with said diaphragm-controlled valve to normally close said valve when said air delivering mechanism is at rest; said control means being automatically movable to assume a position permitting free movement of said valve means when said mechanism is operating to deliver air to said burner.

10. Apparatus for supplying fuel to a burner, comprising: a mixing device communicable with said burner; conduit means communicating with a source of gaseous fuel supply subject to variation in pressure, and operable to deliver gaseous fuel to said mixing device; valve means provided with a valve stem and subject to the variable pressure of said source of gaseous fuel supply and operable to regulate passage of gaseous fuel through said conduit means, said valve means being automatically movable in response to the variable pressure at said source; a fan provided with a fan shaft and fan chamber and disposed in axial alignment with said valve stem and in the same plane with said mixing device, a sleeve surrounding said fan shaft and said valve stem, said sleeve permitting rotation of said fan shaft and reciprocation of said valve stem; and control means cooperating with said sleeve and controlled by said fan for automatically closing said valve when said fan is at rest, said control means actuating said sleeve to permit free movement of said valve means when said fan is operating to deliver air to said burner.

11. Apparatus for supplying fuel to a burner, comprising: a mixing device communicable with said burner; conduit means communicating with a source of gaseous fuel supply subject to variation in pressure, and operable to deliver gaseous fuel to said mixing device; valve means provided with a valve stem and subject to the variable pressure of said source of gaseous fuel supply and operable to regulate passage of gaseous fuel through said conduit means, said valve means being automatically movable in response to the variable pressure at said source; a fan provided with a fan shaft and fan chamber and disposed in axial alignment with said valve stem and in the same plane with said mixing device, a sleeve surrounding said fan shaft and said valve stem, said sleeve permitting rotation of said fan shaft and reciprocation of said valve stem; a centrifugal governor cooperating with said sleeve, said governor provided with means for automatically closing said valve when said fan is at rest, and said governor actuating said sleeve to permit free movement of said valve means when said fan is operating to deliver air to said burner.

12. Apparatus for supplying fuel to a burner, comprising: a mixing device provided with a gaseous fuel inlet, an air inlet, and a mixture outlet, said mixing device communicating with said burner through said mixture outlet; conduit means communicating with a source of gaseous fuel supply subject to variation in pressure and operable to deliver gaseous fuel to said mixing device through said gaseous fuel inlet; a diaphragm-controlled valve subject to the variable pressure of said source of gaseous fuel supply and operable to regulate passage of gaseous fuel through said conduit means, said diaphragm-controlled valve having means normally urging the same in a direction to open said valve, and said diaphragm-controlled valve under influence of variable pressure from said source being operable automatically to move in a closing direction when pressure from said source increases and to move in an opening direction when said pressure decreases; mechanism for delivering air to the air inlet of said mixing device; control means controlled by said mechanism for automatically closing said valve when said mechanism is at rest, said control means being automatically operable to assume a position to permit free movement of said valve means when said mechanism is operating to deliver air to said mixing device; a valve positioned in the fuel inlet to said mixing device to control the amount of fuel admitted thereto, and a valve positioned in the mixture outlet of said mixing device for controlling the gaseous mixture to said burner.

13. Apparatus for supplying fuel to a burner, comprising: a mixing device provided with a gaseous fuel inlet, an air inlet, and a mixture outlet, said mixing device communicating with said burner through said mixture outlet; conduit means communicating with a source of gaseous fuel supply subject to variation in pressure and operable to deliver gaseous fuel to said mixing device through said gaseous fuel inlet; a diaphragm-controlled valve subject to the variable pressure of said source of gaseous fuel supply and operable to regulate passage of gaseous fuel through said conduit means, said diaphragm-controlled valve having means normally urging the same in a direction to open said valve, and said diaphragm-controlled valve under influence of variable pressure from said source being operable automatically to move in a closing direction when pressure from said source increases and to move in an opening direction when said pressure decreases; mechanism for delivering air to the air inlet of said mixing device; control means controlled by said mechanism for automatically closing said valve when said mechanism is at rest, said control means being automatically operable to assume a position to permit free movement of said valve means when said mechanism is operating to deliver air to said mixing device; a valve positioned in the fuel inlet to said mixing device to control the amount of fuel admitted thereto, and a valve positioned in the mixture outlet of said mixing device for controlling the gaseous mixture to said burner, each of said valves comprising a plurality of overlapping sliding members having means defining a single orifice said members being relatively movable for adjustment of the size of said orifice.

14. Apparatus for supplying fuel to a burner, comprising: a mixing device provided with a gaseous fuel inlet, an air inlet, and a mixture outlet, said mixing device communicating with said burner through said mixture outlet; conduit means communicating with a source of gaseous fuel supply subject to variation in pressure and operable to deliver gaseous fuel to said mixing device through said gaseous fuel inlet; a diaphragm-controlled valve subject to the variable pressure of said source of gaseous fuel supply and operable to regulate passage of gaseous fuel through said conduit means, said diaphragm-controlled valve having means normally urging the same in a direction to open said valve, and said diaphragm-controlled valve under influence of variable pressure from said source being operable automatically to move in a closing direction when pressure from said source increases and to move in an opening direction when said pressure decreases; mechanism for delivering air to the air inlet of said mixing device; control means controlled by said mechanism for automatically closing said valve when said mechanism is at rest, said control means being automatically operable to assume a position to permit free movement of said valve means when said mechanism is operating to deliver air to said mixing device; a valve positioned in the fuel inlet to said mixing device to control the amount of fuel admitted thereto, and a valve positioned in the mixture outlet of said mixing device for controlling the gaseous mixture to said burner, each of said valves comprising a plurality of overlapping sliding valve members, each member having a notch in one edge, and said notches together cooperating to define a single orifice, said members being relatively movable for adjustment of the size of said orifice.

ANDREW GORRETTA.